No. 735,071. PATENTED AUG. 4, 1903.
G. D. DELPRAT.
EXTRACTION OF ZINC, LEAD, AND SILVER SULFIDS FROM THEIR ORES.
APPLICATION FILED JAN. 2, 1903.
NO MODEL.
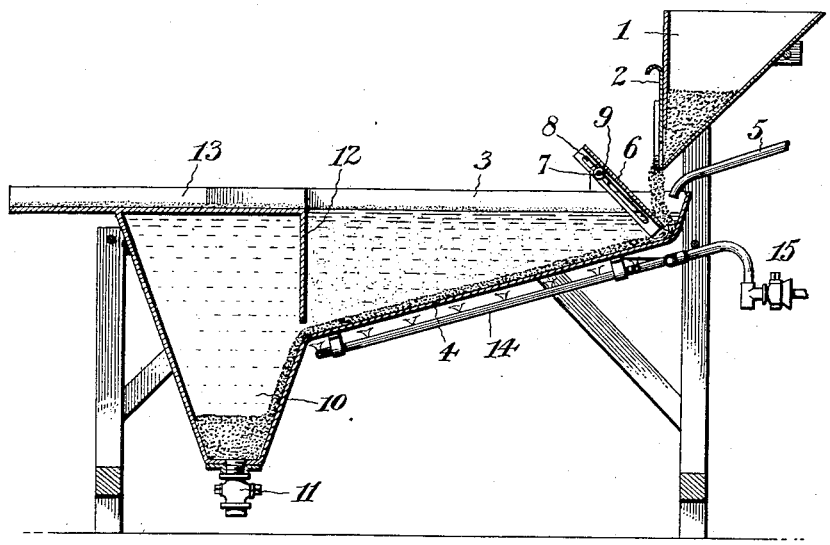

No. 735,071. Patented August 4, 1903.

UNITED STATES PATENT OFFICE.

GUILLAUME D. DELPRAT, OF BROKEN HILL, NEW SOUTH WALES, AUSTRALIA.

EXTRACTION OF ZINC, LEAD, AND SILVER SULFIDS FROM THEIR ORES.

SPECIFICATION forming part of Letters Patent No. 735,071, dated August 4, 1903.

Application filed January 2, 1903. Serial No. 137,586. (No specimens.)

*To all whom it may concern:*

Be it known that I, GUILLAUME DANIEL DELPRAT, general manager of the mines and works of the Broken Hill Proprietary Company, Limited, of Victoria, a subject of the Queen of the Netherlands, residing at Broken Hill, in the State of New South Wales and Commonwealth of Australia, have invented new and useful Improvements in the Extraction of Zinc, Lead, and Silver Sulfids from Their Ores, of which the following is a specification.

This invention relates to the extraction or concentration of sulfid ores to separate them from their gangue.

The ore is first finely ground or stamped and then immersed or dropped into a bath or solution, hereinafter described. An apparatus for carrying out the process forms the subject-matter of a separate application, filed March 9, 1903, Serial No. 146,895. This process is readily carried out at ordinary temperatures and depends upon the ore particles being attacked by the acid to form a gas. Each ore particle so attacked will have a bubble or bubbles of gas adhering to it, by means of which it will be floated and can be skimmed or floated off the solution. The particles of the gangue, such as silicates and other substances not quickly or readily attacked by acid or dilute acid, fall to the bottom of the body of the solution and are removed from time to time. To facilitate the floating of the ore particles, suitable salts are added to the solution to increase its specific gravity, as will be hereinafter explained.

In extracting or concentrating, more especially the sulfid ores of zinc, lead, and silver, I make use of a nitric-acid solution, the gravity of which is increased to one and four-tenths, (1.4,) more or less, by the addition of a suitable nitrate, such as an alkaline-metal nitrate, as the nitrate of soda, nitrate of potash, or another metallic nitrate, as the nitrate of zinc dissolved in water, or a mixture of nitrates. The sulfids in the ore are rapidly acted upon by the acid and gas-bubbles formed on them, that quickly carry them to the surface, whence they flow away or are removed by skimming. The tailings or waste may be removed from the bath from time to time, as is necessary or expedient.

The drawing shows in vertical longitudinal section the apparatus used.

Below an ordinary bin or hopper 1, having a regulating discharge-door 2, is the pan or vessel 3, having a sloping bottom 4. The liquor or chemical solution is supplied by pipe 5 from a suitable reservoir (not shown) at an upper level. Just below the door 2 is a plate 6 on pintles or pivots 7 in slots 8, adapted to be clamped by set-screws 9 when the plate is adjusted to the required angle and with the required extent of opening between the lower edge of said plate 6 and the bottom 4, the directing-plate being, primarily, to insure the total immersion of all particles of ore in the fluid or liquor. At the lower end of the inclined bottom 4 is a tailings-receiver or sump 10, having a tailings-discharge 11. At the receiving end of the sump 10 is a baffle-plate 12, extending close to the face of said bottom 4, the object of which is to prevent accumulation of concentrates above the sump 10. Extending from the pan 3 is a launder or trough 13 to receive the overflow and the concentrates. Under the bottom 4 is a piping 14, forming, with the air-inlet cock 15, a Bunsen burner for gas, so that the solution or liquor may be heated, if desired. The ore fed from the hopper 1 drops into the bath and slides by gravity over the bottom to the sump, the ore particles being raised to the surface of the liquor by the gas-bubbles formed, the action of the acid on these ore particles during their travel along the inclined bottom and ore floated off with the overflow through the trough 13, or, if desired, skimmed off.

Having thus described my invention, what I claim as new therein, and desire to secure by Letters Patent, is—

1. The method of separating ores from gangue, which consists in forming a bath containing nitric acid, feeding finely-ground ore thereto, whereby gas-bubbles will be formed on the ore particles to raise them to the surface of the solution, and removing the particles of ore so lifted to the surface, substantially as described.

2. The method of separating ores from gangue, which consists in forming a bath containing nitric acid and a suitable nitrate, feeding finely-ground ore thereto, whereby gas-bubbles will be formed on the ore particles to lift them to the surface and removing the ore particles so raised, substantially as described.

3. The method of separating sulfid ores from their gangue, which consists in forming a bath containing nitric acid, increasing the gravity of the bath by adding thereto the nitrate of an alkaline metal, whereby gas-bubbles will be formed on the ore particles to raise them to the surface, and floating off the particles of ore so raised to the surface, substantially as described.

4. The method of separating sulfid ores from their gangue, which consists in forming a bath containing nitric acid, adding thereto sodium nitrate to increase the specific gravity of the bath, feeding the finely-ground ore into the bath, whereby gas-bubbles will be formed on the surface of the ore particles to raise them to the surface of the bath and floating off the ore particles so raised, substantially as described.

In testimony whereof I have signed my name to this specification in the presence of two subscribing witnesses.

GUILLAUME D. DELPRAT.

Witnesses:
FRED WALSH,
PERCY NEWELL.